US008441701B2

(12) United States Patent
Goto et al.

(10) Patent No.: US 8,441,701 B2
(45) Date of Patent: May 14, 2013

(54) IMAGE PROCESSING APPARATUS, IMAGE PROCESSING METHOD, IMAGE PROCESSING PROGRAM, AND STORAGE MEDIUM

(75) Inventors: Fumitaka Goto, Tokyo (JP); Tetsuya Suwa, Yokohama (JP); Fumihiro Goto, Kawasaki (JP); Yusuke Hashii, Kawasaki (JP); Masao Kato, Kawasaki (JP); Kentaro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/396,364

(22) Filed: Feb. 14, 2012

(65) Prior Publication Data
US 2012/0147432 A1 Jun. 14, 2012

Related U.S. Application Data

(63) Continuation of application No. 13/182,208, filed on Jul. 13, 2011, now Pat. No. 8,139,269, which is a continuation of application No. 11/771,534, filed on Jun. 29, 2007, now Pat. No. 7,999,972.

(30) Foreign Application Priority Data

Jul. 7, 2006 (JP) .................................. 2006-188047

(51) Int. Cl.
H04N 1/46 (2006.01)
H04N 1/407 (2006.01)
H04N 1/409 (2006.01)

(52) U.S. Cl.
USPC .......... 358/532; 358/1.9; 358/3.21; 358/3.22; 358/3.24; 358/3.26; 358/3.27

(58) Field of Classification Search .................... 358/1.9, 358/3.26, 3.27; 382/254–269
See application file for complete search history.

(56) References Cited

U.S. PATENT DOCUMENTS

| 4,672,463 | A | * | 6/1987 | Tomohisa et al. | 358/447 |
|-----------|---|---|--------|-----------------|---------|
| 5,028,991 | A | * | 7/1991 | Sekizawa et al. | 358/537 |
| 5,381,522 | A | * | 1/1995 | Seto et al. | 345/443 |
| 5,594,555 | A | * | 1/1997 | Ishida | 358/448 |
| 5,975,673 | A | * | 11/1999 | Ohtsuka et al. | 347/15 |
| 6,104,462 | A | * | 8/2000 | Kurosaki et al. | 349/138 |
| 6,106,093 | A | * | 8/2000 | Nagoshi et al. | 347/15 |
| 6,167,167 | A | * | 12/2000 | Matsugu et al. | 382/283 |
| 6,192,152 | B1 | * | 2/2001 | Funada et al. | 382/199 |
| 6,384,857 | B2 | * | 5/2002 | Sasanuma et al. | 347/251 |
| 6,392,759 | B1 | * | 5/2002 | Kuwata et al. | 358/1.9 |
| 6,665,439 | B1 | * | 12/2003 | Takahashi | 382/199 |

(Continued)

Primary Examiner — Richard Zhu
(74) Attorney, Agent, or Firm — Canon USA, Inc., IP Division

(57) ABSTRACT

An image processing apparatus includes an obtaining unit, a determination unit, a setting unit, and a processing unit to perform an image edge intensifying processing. The obtaining unit obtains image data by reading a document. The determination unit determines an image edge direction. The setting unit sets an edge intensifying processing intensity based on the image data and a processing intensity determined corresponding to a difference between resolution in a main scanning direction and resolution in a sub-scanning direction. The processing unit performs the image edge intensifying processing according to the set intensity. In response to the resolution of the image data being higher in the sub-scanning direction than in the main scanning direction, the setting unit sets a higher intensity of the edge intensifying processing in response to the edge direction being along the sub-scanning direction than in response to the edge direction being along the main scanning direction.

8 Claims, 15 Drawing Sheets

U.S. PATENT DOCUMENTS

| | | | |
|---|---|---|---|
| 6,924,839 B2 * | 8/2005 | Eiho et al. | 348/252 |
| 7,406,208 B2 * | 7/2008 | Chiang | 382/266 |
| 7,636,455 B2 * | 12/2009 | Keaton et al. | 382/104 |
| 7,746,503 B2 * | 6/2010 | Lim | 358/3.27 |
| 2002/0039444 A1 * | 4/2002 | Yamagata et al. | 382/199 |
| 2006/0181725 A1 * | 8/2006 | Matsuya | 358/1.9 |

* cited by examiner

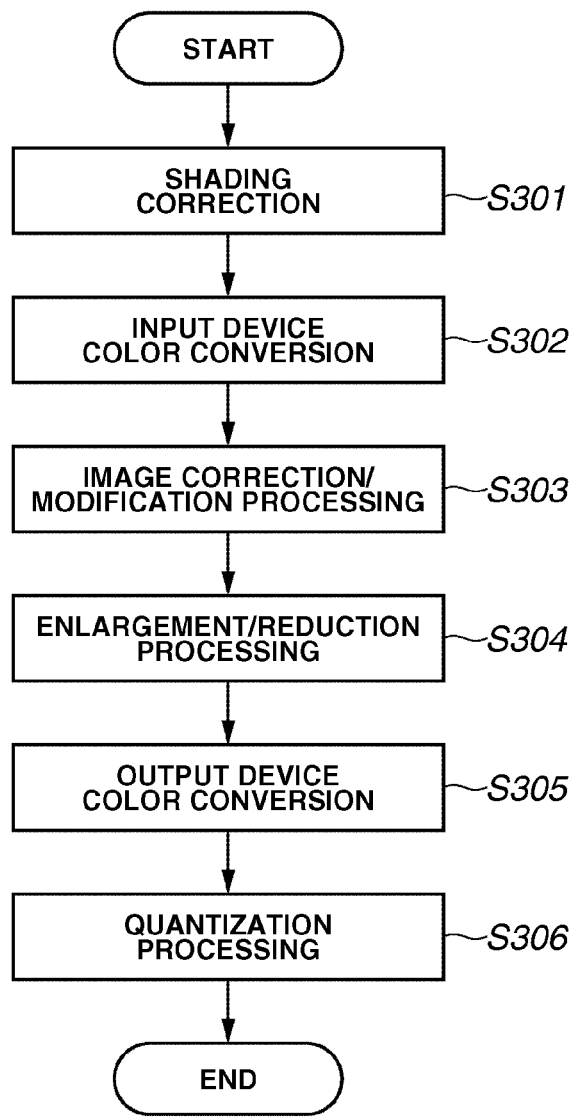

FIG.9A1
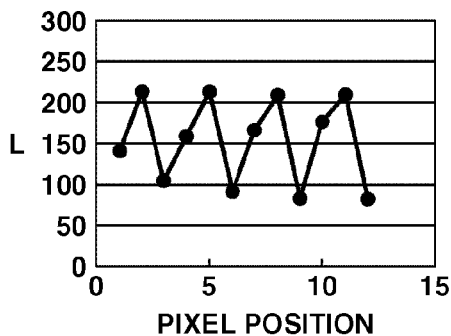
FIG.9A2
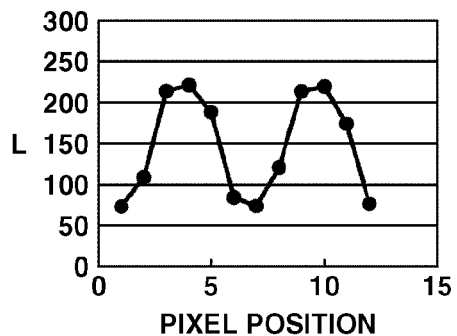
FIG.9B1
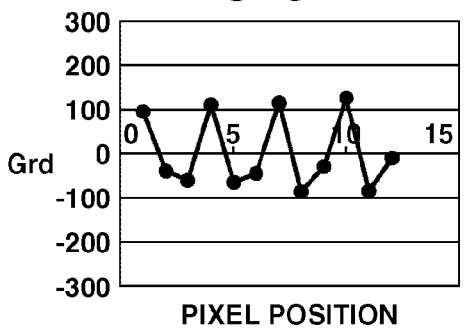
FIG.9B2
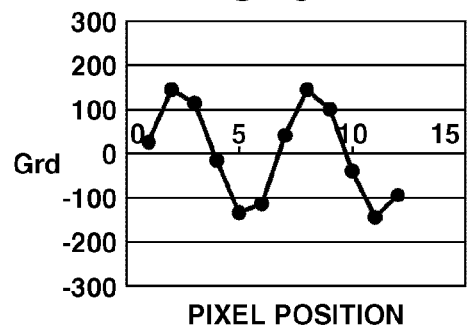
FIG.9C1
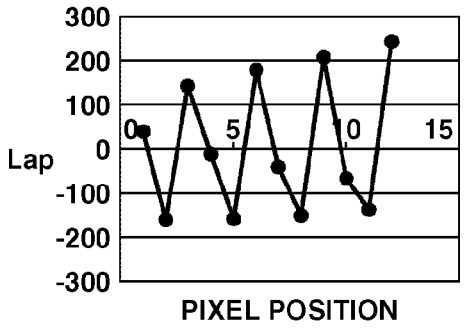
FIG.9C2
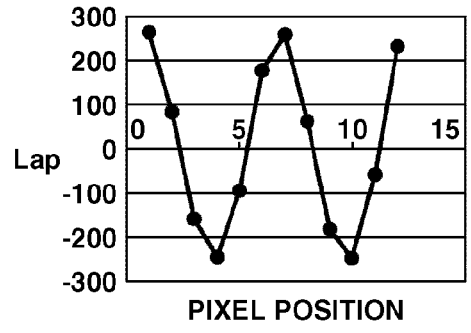
FIG.9D1
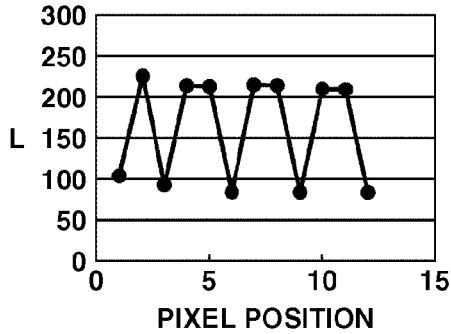
FIG.9D2
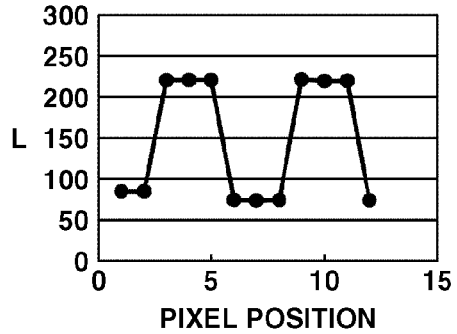

| -3 | -7 | -8 | -7 | -3 |
| -7 | 4 | 22 | 4 | -7 |
| -8 | 22 | 60 | 22 | -8 |
| -7 | 4 | 22 | 4 | -7 |
| -3 | -7 | -8 | -7 | -3 |

IMAGE PROCESSING APPARATUS, IMAGE PROCESSING METHOD, IMAGE PROCESSING PROGRAM, AND STORAGE MEDIUM

CROSS REFERENCE TO RELATED APPLICATIONS

The present application is a continuation of U.S. patent application Ser. No. 13/182,208, filed on Jul. 13, 2011, which is a continuation of U.S. patent application Ser. No. 11/771,534, filed on Jun. 29, 2007, which claims priority from Japanese Patent Application No. 2006-188047, filed Jul. 7, 2006, all of which are hereby incorporated by reference herein in their entirety.

BACKGROUND OF THE INVENTION

1. Field of the Invention

The present invention relates to an image processing apparatus configured to apply correction processing to an image, an image processing method, an image processing program, and a storage medium storing the program.

2. Description of the Related Art

Copying machines are equipped with a scanner that optically reads a document image and a printer that prints the read image on a paper or other recording medium. However, an edge of an optically read image tends to be dull compared to an edge of the original document. Therefore, when the printer performs printing based on the image read by the scanner, a printed image on a recording medium tends to lack sharpness.

In order to enhance sharpness, it is useful to apply edge intensifying processing to image data read by a scanner. However, the edge intensifying processing may intensify moire appearance when a halftone dot image is read. To address this problem, a segmentation technique may be applied to image data read by a scanner.

A conventional segmentation technique involves separating a read image into a character region and a halftone dot region, and applying edge intensifying processing to the character region and applying smoothing processing to the halftone dot region. As a result, the segmentation technique may improve the sharpness of characters and reduces the moire appearance.

However, if the separated regions in the segmentation is inaccurate, characters may be erroneously subjected to smoothing processing while a halftone dot image may be subjected to edge intensifying processing. As a result, image quality may deteriorate.

Furthermore, when segmentation accuracy is insufficient, characters may be determined as partly belonging to a character region and partly belonging to a halftone dot region. This causes undesirable switching between the edge intensifying processing and the smoothing processing. As a result of segmentation inaccuracy, the image quality may greatly deteriorate. To address the above-described problems, the following techniques have been proposed.

As discussed in Japanese Patent No. 03099354 (first technique), it may be useful to continuously set an edge intensifying amount depending on an edge amount. The first technique can adaptively realize edge intensification depending on the edge amount and reduce image deterioration caused by the above-described switching, although the moire appearance of a halftone dot image may be intensified.

Furthermore, an edge intensifying technique using a filter is conventionally known as a technique capable of intensifying characters.

As discussed in Japanese Patent No. 02620368 (second technique), replacement processing can be applied to an edge region having moderate density that appear in a reading operation. According to the second technique, for the purpose of obtaining a sharp edge, a moderate edge region is replaced with a solid region of a character or a background region.

However, the replacement processing for completely replacing a moderate edge region with a solid region of a character or a background region may cause jaggy image (i.e., an image having a non-smooth or zigzag edge portion). The following technique has been proposed to eliminate the jaggy image.

As discussed in Japanese Patent Application Laid-Open No. 11-127353 (third technique), smoothing processing may be performed to reduce the possibility of generating jaggy images. The third technique includes detecting where a jaggy image may appear and converting the image data in the detected region into data having high resolution and a multiple value.

A scanner for a copying machine may include a line sensor having reading elements aligned in a main-scanning direction. Such a conventional scanner can read an image of a document when the line sensor shifts in a sub-scanning direction relative to the document.

A conventional sensor may have reading resolution in the main-scanning direction which is different from reading resolution in the sub-scanning direction.

In general, the main-scanning resolution of a line sensor is dependent on the alignment intervals of reading elements. If a scanner can read a document while it causes a relative shifting in the sub-scanning direction with the resolution different from the main-scanning resolution, the reading resolution in the main-scanning direction is different from the reading resolution in the sub-scanning direction.

A copying machine, using a scanner having the main-scanning resolution different from the sub-scanning resolution, reads an image having the reading resolution in the sub-scanning direction higher than the reading resolution in the main-scanning direction, and converts the main-scanning resolution into the sub-scanning resolution when the read image is output.

The copying machine can apply edge intensifying processing to an image having the main-scanning resolution different from the sub-scanning resolution having been read by the above-described scanner. Then, the copying machine can convert the main-scanning resolution into the sub-scanning resolution when the read image is output.

In this case, to convert the resolution in the main-scanning direction (i.e., low resolution reading direction) into the resolution in the sub-scanning direction (i.e., high resolution reading direction), on the image that was subjected to the edge intensifying processing, the copying machine performs the conversion so as to increase the number of pixels aligned in the main-scanning direction. As a result, a jaggy edge portion of a character or a line segment resulting from the edge intensifying processing may expand in the sub-scanning direction.

Furthermore, there is a scanner having MTF (Modulation Transfer Function) varying depending on the direction due to lens characteristics. The defocused state and sharpness are depending on the direction, and a jaggy image region may appear if the replacement processing discussed in Japanese Patent No. 02620368 is applied to the image.

SUMMARY OF THE INVENTION

Exemplary embodiments of the present invention are directed to an image processing apparatus configured to perform image correction processing and capable of improving image quality.

According to an aspect of the present invention, an image processing apparatus for performing an edge intensifying processing of an image includes an obtaining unit configured to obtain image data generated by optically reading a document, the image data corresponding to respective pixels aligned in a main scanning direction and a sub-scanning direction perpendicular to the main scanning direction, a determination unit configured to determine an edge direction of an image, a setting unit configured to set an intensity of the edge intensifying processing based on the image data and an intensity of processing determined corresponding to a difference between resolution in the main scanning direction and resolution in the sub-scanning direction, and a processing unit configured to perform the edge intensifying processing of an image according to the intensity set by the setting unit, wherein, in response to the resolution of the image data being higher in the sub-scanning direction than in the main scanning direction, the setting unit sets a higher intensity of the edge intensifying processing in response to the edge direction being along the sub-scanning direction than in response to the edge direction being along the main scanning direction.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the invention and, together with the description, serve to explain at least some of the principles of the invention.

FIG. 3 is a flowchart illustrating image processing performed in the MFP according to an exemplary embodiment of the present invention.

FIGS. 9A1-9D1 and 9A2-9D2 are graphs illustrating exemplary feature quantities.

DETAILED DESCRIPTION OF THE EMBODIMENTS

Figure 1A:
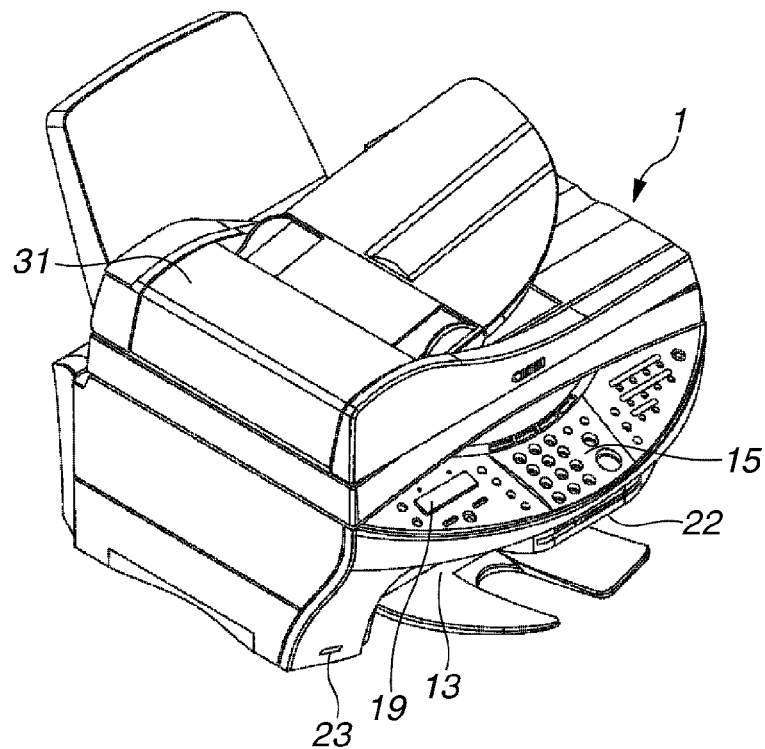
FIGS. 1A and 1B are perspective diagrams illustrating a multifunction peripheral (MFP) according to an exemplary embodiment of the present invention.

The following description of exemplary embodiments is illustrative in nature and is in no way intended to limit the invention, its application, or uses.

Processes, techniques, apparatus, and systems as known by one of ordinary skill in the art are intended to be part of the enabling description where appropriate.

For example, certain circuitry for image processing, data processing, and other uses may not be discussed in detail. However, these systems and the methods to fabricate these systems as known by one of ordinary skill in the relevant art are intended to be part of the enabling disclosure herein where appropriate.

It is noted that throughout the specification, similar reference numerals and letters refer to similar items in the following figures, and thus once an item is described in one figure, it may not be discussed for following figures.

Exemplary embodiments will be described in detail below with reference to the drawings.

First Exemplary Embodiment

Figure 1B:
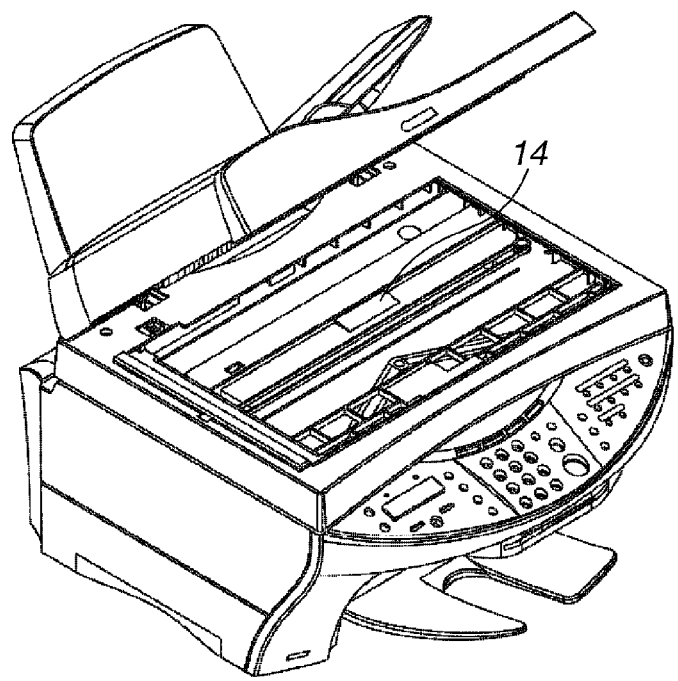

FIGS. 1A and 1B are perspective diagrams illustrating a multifunction peripheral (MFP) 1 according to an exemplary embodiment of the present invention. FIG. 1A illustrates the MFP 1 with an auto document feeder (ADF) 31 which is in a closed state. FIG. 1B illustrates the MFP 1 with the ADF 31 which is in an opened state.

The MFP 1 can communicate with a host computer (PC) and receive data to print or scan the received data. The MFP 1, when operating independently, can function as a copying machine for printing an image read by a scanner, and function as a printer for printing image data read from a memory card or other storage medium and printing image data received from a digital camera.

As illustrated in FIGS. 1A and 1B, the MFP 1 includes a scan unit 14 such as a flat bed scanner, a print unit 13 of an inkjet type or an electrophotographic type, and an operation unit 15 equipped with a display unit 19 (e.g., a display panel) and various key switches. Furthermore, the MFP 1 includes a USB port (not illustrated) provided on its back surface to communicate with the PC, a card interface 22 including card slots capable of reading data from various memory cards, and a camera interface 23 including a camera port for performing data communications with a digital camera. The MFP 1 includes the ADF 31 that can automatically set a document on a platen glass.

Figure 2:
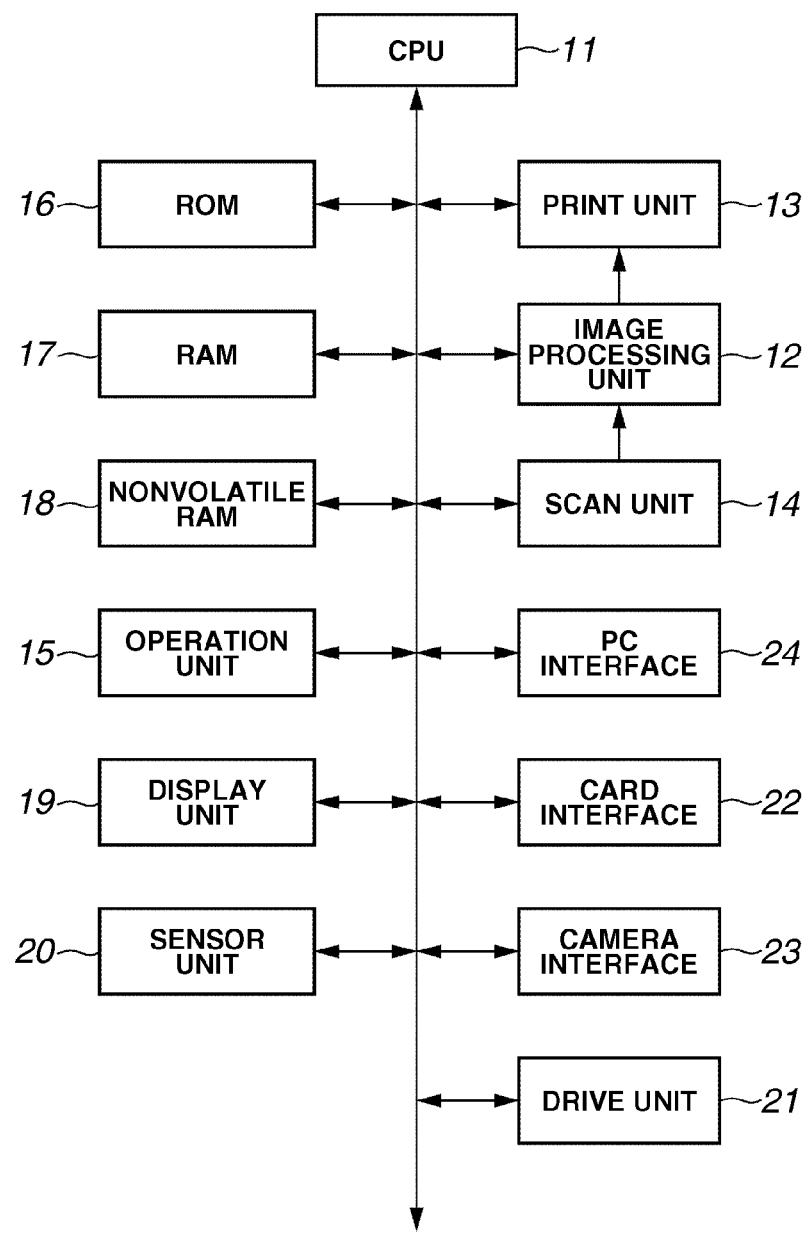
FIG. 2 is a block diagram illustrating a configuration of the MFP according to an exemplary embodiment of the present invention.

FIG. 2 is a block diagram illustrating an exemplary configuration of the MFP 1.

In FIG. 2, CPU 11 controls various functions of the MFP 1 and executes an image processing program stored in ROM 16 according to a predetermined instruction input via the operation unit 15. Through execution of the program, the CPU 11 can select object pixels to be processed and extract a predetermined size of image region including the processing target pixels.

Furthermore, the CPU 11 can calculate a feature quantity including a variation amount relating to the image region based on signal values of pixels included in the image region.

The ROM 16 stores various tables and formulas used in the image processing and can function as a setting unit configured to set a relationship between the feature quantity and correction intensity.

The scan unit 14, including a charge coupled device (CCD), is capable of reading a document image and outputting analog luminance data of red (R), green (G), and blue (B) colors. As described below, the scan unit 14 can output an image having a main-scanning resolution different from a sub-scanning resolution (as image data of a read document which are AD converted and to be subjected to shading correction). For example, the output image may have a main-scanning resolution of 300 dpi and a sub-scanning resolution of 600 dpi. The scan unit 14 may include a contact image sensor (CIS) instead of using the CCD. The ADF 31 can continuously read a plurality of documents and order sheets.

The card interface 22 can read image data from a memory card or other storage medium that stores image data captured by a digital still camera (DSC) in response to an instruction input by a user via the operation unit 15. An image processing unit 12 can convert a color space of the image data read via the card interface 22, for example, from a DSC color space (e.g., YCbCr) to a standard RGB color space (e.g., NTSC-RGB or sRGB).

Furthermore, based on header information, the image processing unit 12 can apply various processing to the read image data, such as conversion of resolution corresponding to the number of effective pixels, if the application requires. The camera interface 23 can be directly connected to the DSC to read image data.

The image processing unit 12 performs image processing, such as conversion of reading signal value, correction and modulation processing of image, conversion from RGB luminance signals to CMYK concentration signals, scaling, gamma conversion, and error diffusion. The correction processing performed by the image processing unit 12 includes replacement processing, achromatic coloring processing, and filter processing. The image processing unit 12 functions as a correction unit. RAM 17 stores the image data obtained by the image processing unit 12. If the correction data stored in the RAM 17 reaches a predetermined amount, the print unit 13 starts recording the correction data.

A nonvolatile RAM 18 can be a Static Random Access Memory (SRAM) which is backed up by a battery. The RAM 18 stores data unique to the MFP 1.

The operation unit 15 includes a photo direct print start key that enables a user to select image data stored in a memory card or other storage medium and start recording of the selected data. Furthermore, the operation unit 15 includes an order sheet print key, an order sheet reading key, a copy start key usable in a monochrome copy mode or a color copy mode, a mode key that enables a user to designate copy resolution, image quality, or other mode settings, a stop key for stopping a copy operation, ten keys enabling a user to input the number of copies, and a registration key. The CPU 11 controls respective units based on the operated states of these keys.

The display unit 19 includes a dot matrix liquid crystal display unit (LCD) and an LCD driver. The CPU 11 controls the display unit 19 to perform various displays. For example, the display unit 19 can realize a thumbnail display of image data recorded in a memory card or other storage medium. The print unit 13 can include an inkjet head and a general IC. The CPU 11 reads recorded data stored in the RAM 17, controls the print unit 13 to print the data and outputs a hard copy of the data.

A drive unit 21 drives the scan unit 14 and the print unit 13. To this end, the drive unit 21 includes a stepping motor configured to shift a mirror or a contact sensor of the scan unit 14 relative to a document placed on the platen glass, in addition to a stepping or DC motor for driving sheet feed/discharge rollers, a gear mechanism for transmitting a driving force of the motor, and a driver circuit for controlling the motor.

A sensor unit 20 includes a recording sheet width sensor, a recording sheet presence sensor, a document width sensor, a document presence sensor, and a recording medium detection sensor. The CPU 11 obtains information indicating the state of a document or a recording sheet based on signals supplied from the sensor unit 20.

A PC interface 24 is an interface that can control communications between the MFP 1 and a PC. More specifically, the MFP 1 can print data transmitted from the PC via the PC interface 24 and can scan a document according to an instruction transmitted from the PC. In a copy mode, the MFP 1 applies predetermined data processing to the image data read by the scan unit 14 and causes the print unit 13 to print the processed image data.

When a user instructs a copy operation via the operation unit 15, the scan unit 14 starts reading a document placed on a platen glass. The scan unit 14 transmits the read data to the image processing unit 12. The image processing unit 12 applies various image processing operations to the received data and transmits the processed image data to the print unit 13. The print unit 13 performs printing of the image data.

FIG. 3 is a flowchart illustrating exemplary image processing performed by the MPF 1 that operates in the copy mode.

In step S301, to correct differences caused by the image sensor, the CPU 11 applies shading correction processing to image data read by the scan unit 14 and AD converted.

In step S302, the CPU 11 performs input device color conversion processing to convert unique signal data of an input device into data of a standard color space region. The standard color space region is, for example, sRGB defined by the International Electrotechnical Commission (IEC) or can be AdobeRGB proposed by Adobe Systems Incorporated. As an exemplary conversion method, the CPU 11 can use a calculation system based on 3×3 or 3×9 matrix or a lookup table system using a table of conversion rules.

In step S303, the CPU 11 applies correction (modulation) processing to the converted data. More specifically, the CPU 11 performs edge intensifying processing for correcting defocused states caused in a reading operation, character modulation processing for improving readability of characters, and processing for removing show-through effects which may be caused in a reading operation using light irradiation.

In step S304, the CPU 11 performs enlargement/reduction processing. When a user designates changing of a zooming rate, or when a user designates allocating of two documents on a piece of paper, the CPU 11 sets a suitable magnification. The conversion method is, for example, a bicubic method, a bilinear method, or a nearest neighbor method.

As described later, if an image of a read document has a main-scanning resolution different from a sub-scanning resolution, in step S304, the CPU 11 performs processing for matching the resolution in the main-scanning direction with the resolution in the sub-scanning direction.

For example, if the image corrected in step S303 has a main-scanning resolution of 300 dpi and a sub-scanning resolution of 600 dpi, the CPU 11 can perform conversion for obtaining the same resolution of 300 dpi in both the horizontal and sub-scanning directions if such resolutions are finally required.

In step S305, the CPU 11 converts the data of the standard color space into signal data unique to an output device. When a printer of the MFP 1 is an inkjet type, the CPU 11 executes processing for generating color data of cyan, magenta, yellow, and black inks. The conversion method in step S302 can be similarly used in step S305.

In step S306, the CPU 11 performs quantization processing for converting the color data into data having the number of levels that the printer can record. For example, when the printer can perform recording of ink dots based on 2-valued information (e.g., on/off), the CPU 11 can use a quantization method such as error diffusion to obtain binary data. The color data obtained through the quantization processing has a data format suitable for the printer that performs a recording operation based on the converted color data and forms an image.

Figure 4A:
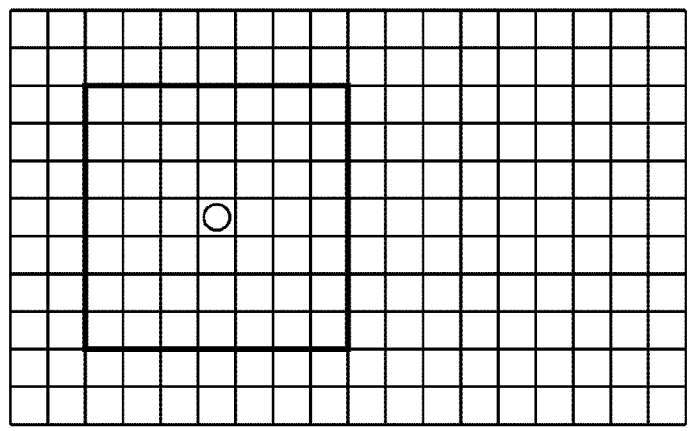
FIGS. 4A to 4C illustrate exemplary processing regions set when the MPF performs correction processing.

FIG. 4A illustrates an exemplary processing region (i.e., a regional unit to be processed) when the MPF 1 performs correction processing. The CPU 11 sets a 7×7 region including 7×7 pixels with a central target pixel (indicated by mark ○ as processing target). A bold line in FIG. 4A indicates the 7×7 region set by the CPU 11.

Figure 4B:
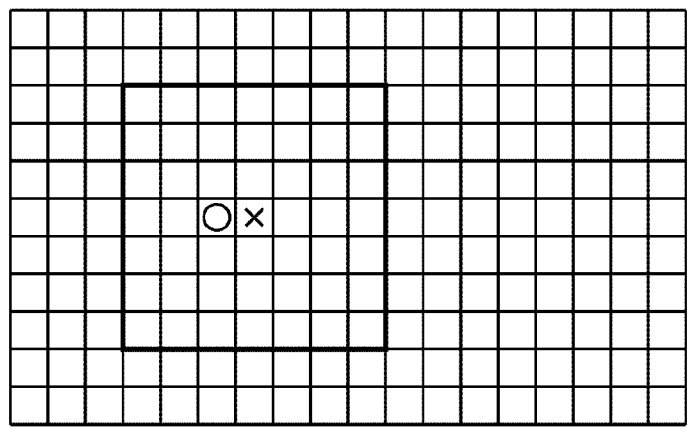

The CPU 11 applies image processing to the target pixel based on image signals in the 7×7 region. Then, the CPU 11 sets, for example, the next target pixel adjoining the present target pixel, as indicated by mark x in FIG. 4B. The CPU 11 sets a 7×7 region and executes image processing similarly. In this manner, the CPU 11 successively changes the target pixel and sets a 7×7 region to correct all target pixels.

Figure 4C:
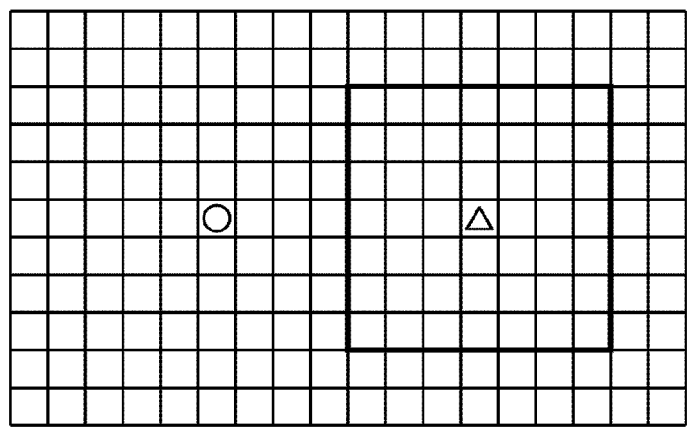

Alternatively, the CPU 11 can shift the correction processing region by a distance equivalent to a width of the region. For example, the CPU 11 can set a 7×7 region including a central target pixel indicated by mark ○ in FIG. 4A, and apply the same correction intensity to the target pixel and other pixels in the 7×7 region. Next, the CPU 11 can set a 7×7 region including a central target pixel indicated by mark Δ in FIG. 4C. In other words, the CPU 11 shifts the correction processing region by a distance equivalent to the width of the region so that the 7×7 region including the central pixel ○ adjoins the 7×7 region including the central pixel Δ.

In the present exemplary embodiment, in order to more accurately set the correction intensity, the CPU 11 shifts the correction processing region by a distance equivalent to the width of one pixel.

Figure 5:
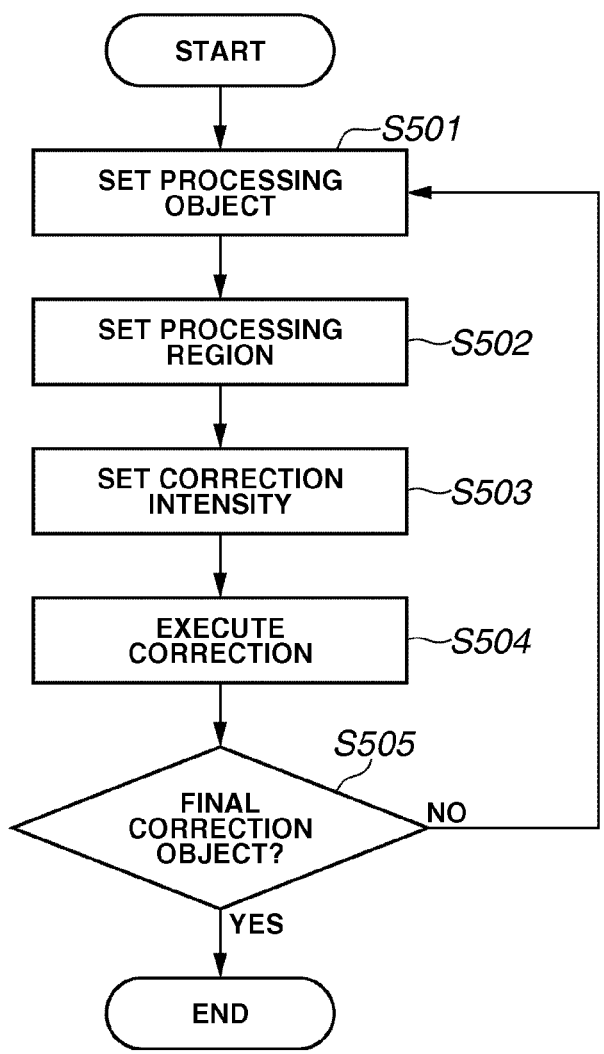
FIG. 5 is a flowchart illustrating exemplary processing for shifting the correction processing region.

FIG. 5 is a flowchart illustrating exemplary processing for shifting the correction processing region. In step S501, the CPU 11 sets a processing object. The CPU 11 sets an initial processing object upon starting the processing of this routine. When the processing flow returns from step S505 to step S501, the CPU 11 sets the next processing object.

In step S502, the CPU 11 sets a processing region. As described above, the processing region is a region including a plurality of pixels (e.g., 7×7 region) with a central target pixel.

In step S503, the CPU 11 allocates correction intensity to the processing region set in step S502.

In step S504, the CPU 11 executes correction processing. More specifically, the CPU 11 applies correction to the processing region based on the correction intensity set in step S503.

In step S505, the CPU 11 determines whether the correction object is a final processing region. If the CPU 11 determines that the correction object is not the final processing region (NO in step S505), the processing flow returns to step S501. If the correction object is the final processing region (YES in step S505), the CPU 11 terminates the processing of this routine.

The following is the definition of technical terms used in the present exemplary embodiment.

The "variation amount" is a value representing the magnitude of variation in a pixel signal value in the pixel group including a processing object pixel positioned at the center thereof. In the present exemplary embodiment, the variation amount is defined as a maximum absolute value in the difference of luminance value between two pixels adjoining one pixel at both sides thereof (refer to "edge amount").

The variation amount is not limited to a specific value and therefore can be defined based on any other information. For example, the variation amount can be a value representing the absolute value of a 1st-order differential of a value relating to an image signal of a target pixel, or any other value expressing the difference (magnitude) of change, such as a value representing the difference (magnitude) of change in a value relating to image signals in a target region.

The "number of times of variation" is a value representing the frequency of variation in the pixel signal value, occurring in a pixel group including a processing object pixel positioned at the center thereof. In the present exemplary embodiment, the number of times of variation is defined as a value representing the frequency of increase/decrease in 3-valued data (sign change number (number of zero-crossing points)) which are 3-valued data (e.g., −, 0, +) representing the difference in luminance value between two pixels adjoining one pixel at both sides thereof in the image region.

However, the number of times of variation is not limited to a specific value and therefore can be defined based on any other information. For example, the number of times of variation can be defined as a value expressing the frequency of change in a value relating to an image signal such as the number of zero-crossing points (or space frequency) in a 1st-order differential of a value relating to an image signal of an image region, or the number of changes in black and white binarized data.

The "variation acceleration" is a value representing an acceleration of variation in the pixel signal value, in a pixel group including a processing object pixel positioned at the center thereof.

In the following exemplary embodiment, the variation acceleration is defined as a value representing the luminance difference in the image region. However, the variation acceleration is not limited to a specific value and therefore can be defined based on any other information. For example, the variation acceleration is a value expressing a 2nd-order differential of a value relating to an image signal in a target region or any other value expressing the acceleration of change.

The "color saturation" is defined as a maximum absolute value in the difference of image signals of each color in a target pixel (or region). However, the color saturation is not limited to a specific value and therefore can be defined based on any other information. The color saturation can be defined as a value expressing the distance from the luminance axis.

Furthermore, the processing for "adaptively setting the correction intensity" is defined as processing for setting correction intensity differentiated for each value in at least part of a value region taken by the defined "number of times of variation", "variation amount", "variation acceleration", and "color saturation."

In the first exemplary embodiment, the scan unit 14 is a contact image sensor (CIS) whose reading resolution is 300 dpi in the main-scanning direction and 600 dpi in the sub-scanning direction. The correction processing performed by the CPU 11 is replacement processing.

Figure 6A:
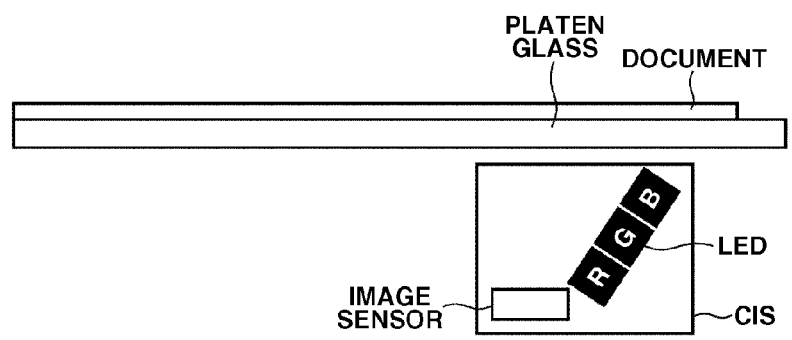
FIGS. 6A and 6B illustrate an exemplary contact image sensor (CIS).
Figure 6B:
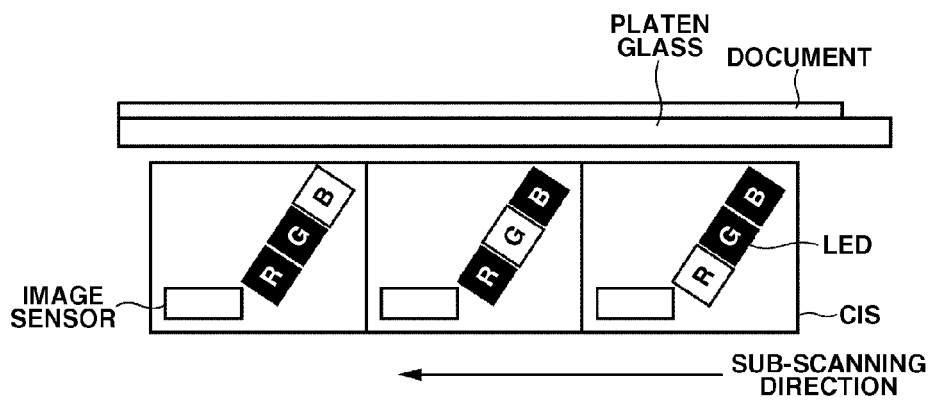

FIGS. 6A and 6B illustrate exemplary 1-pass reading processing performed by a CIS including three light sources which can be successively turned on. The scan unit 14 of the CIS, as illustrated in FIG. 6A, includes three (RGB) light emitting diodes and a single image sensor. As illustrated in FIG. 6B, the CIS performs reading processing by successively turning on the RGB light emitting diodes.

In FIGS. 6A and 6B, an LED of a black character with white background is in a turned-on state and an LED of a white character with black background is in a turned-off state.

The CIS shifts in the sub-scanning direction. More specifically, reading positions of the RGB light emitting diodes relative to a document placed on a platen glass are mutually different. Therefore, color shifts may occur in the sub-scanning direction when the CIS reads an edge of a document.

Figure 7A:
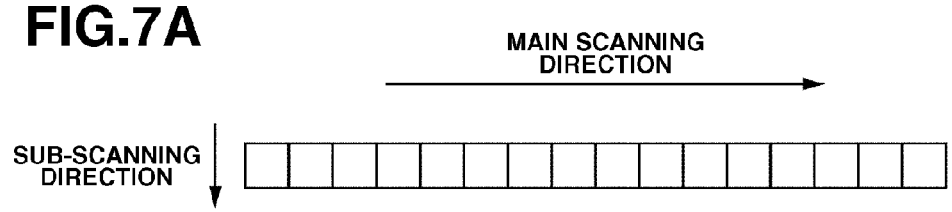
FIGS. 7A to 7C illustrate exemplary reading resolutions in horizontal and sub-scanning directions.
Figure 7B:
Figure 7C:

FIGS. 7A to 7C illustrate an exemplary operation of the CIS that can perform reading processing with the resolution of 300 dpi in the main-scanning direction and 600 dpi in the sub-scanning direction.

As illustrated in FIG. 7A, the CIS according to the present exemplary embodiment includes image sensors disposed along a line at intervals equivalent to 1200 dpi in the main-scanning direction. As illustrated in FIG. 7B, the CIS shifts a distance equivalent to 600 dpi in the sub-scanning direction so that the sensors can store electric charge while the LEDs are turned on.

On the other hand, the CIS adds the electric charge of four consecutive pixels aligned in the main-scanning direction and regards the summed-up electric charge as electric charge of one pixel, as indicated by a bold line in FIG. 7C.

Thus, the CIS can perform reading processing with the resolution of 300 dpi in the main-scanning direction and 600 dpi in the sub-scanning direction.

Compared to the above-described reading mode (i.e., 300× 600 mode), a reading mode having a main-scanning resolution of 600 dpi and a sub-scanning resolution of 600 dpi (i.e., 600×600 mode) can obtain an excellent image quality.

However, if a high-speed reading mode (e.g., a high-speed copy operation mode) higher than the 600×600 mode is required, the S/N ratio may deteriorate due to insufficient storage time.

Hence, as illustrated in FIG. 7C, summing up the electric charge of a plurality of pixels aligned in the main-scanning direction can improve the S/N ratio. As a result, the main-scanning resolution can be differentiated from the sub-scanning resolution.

The relationship "main-scanning resolution<sub-scanning resolution" is an example in the exemplary embodiment. Any other conditions can be used to differentiate the main-scanning resolution from the sub-scanning resolution.

In the first exemplary embodiment, the MFP 1 performs replacement processing as exemplary correction processing.

Figure 8:
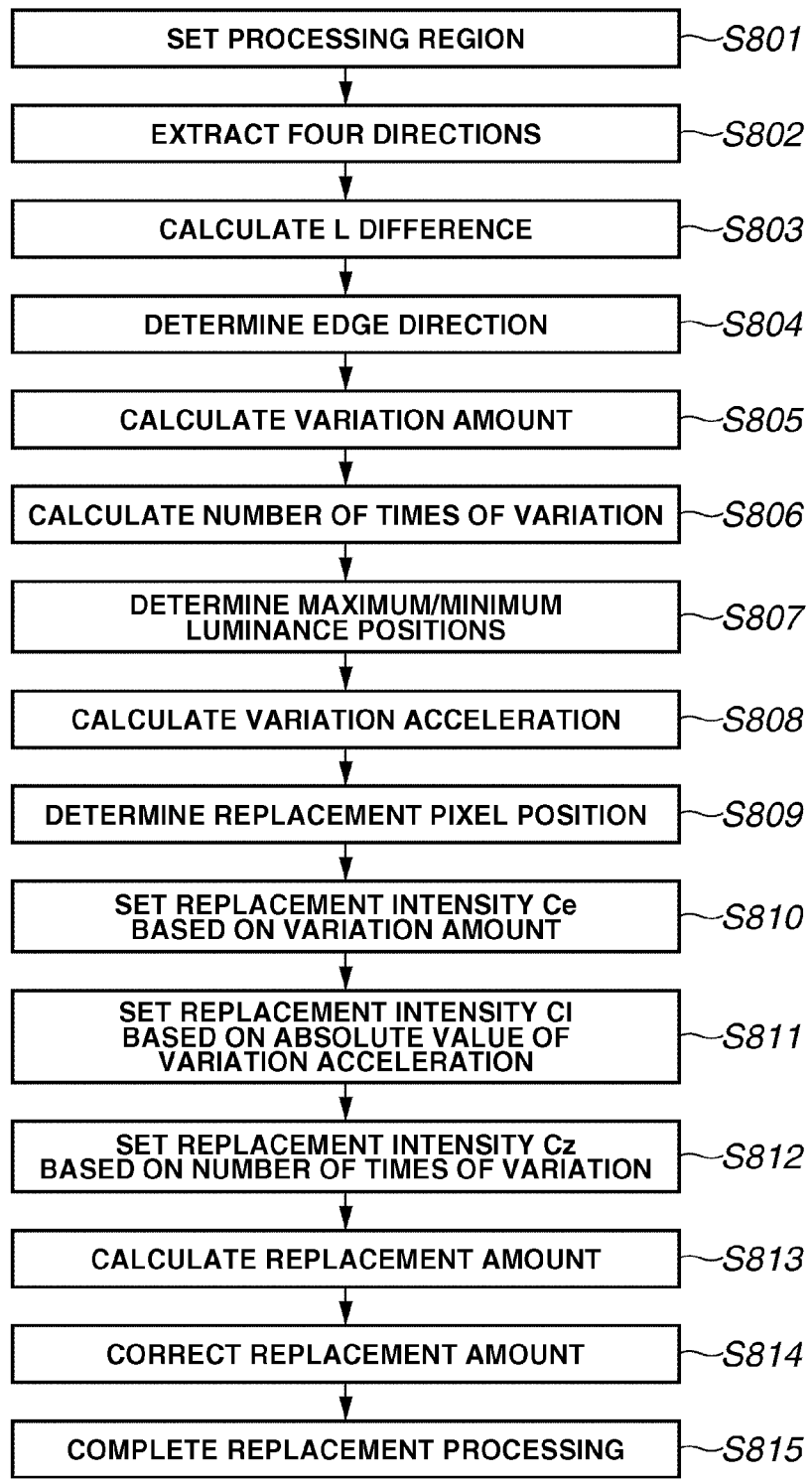
FIG. 8 is a flowchart illustrating correction intensity setting processing according to a first exemplary embodiment of the present invention.

FIG. 8 is a flowchart illustrating correction intensity setting processing according to the first exemplary embodiment.

Step S801 is a step of setting a processing region. More specifically, in the image data including RGB multi-value image signals, the CPU 11 sets a 7×7 processing region including seven pixels in the lateral direction and seven pixels in the vertical direction with a target pixel positioned at the center thereof. The CPU 11 calculates a luminance L based on respective pixel values in the processing region according to the formula (1) and generates a 7×7 processing region having the luminance L.

$$L=(R+2\times G+B)/4 \quad (1)$$

The present exemplary embodiment calculates the luminance L according to the formula (1). However, the present exemplary embodiment can use any another luminance value, such as luminance $L^*$ in a uniform color space $L^*a^*b^*$ or luminance Y of YCbCr.

FIG. 9A1 illustrates the luminance L measured in a main-scanning operation of the CIS that reads black vertical lines (4 lines/mm) in contrast with white background. FIG. 9A2 illustrates the luminance L measured in a sub-scanning operation of the CIS that reads black lateral lines (4 lines/mm) in contrast with white background.

Figure 10:
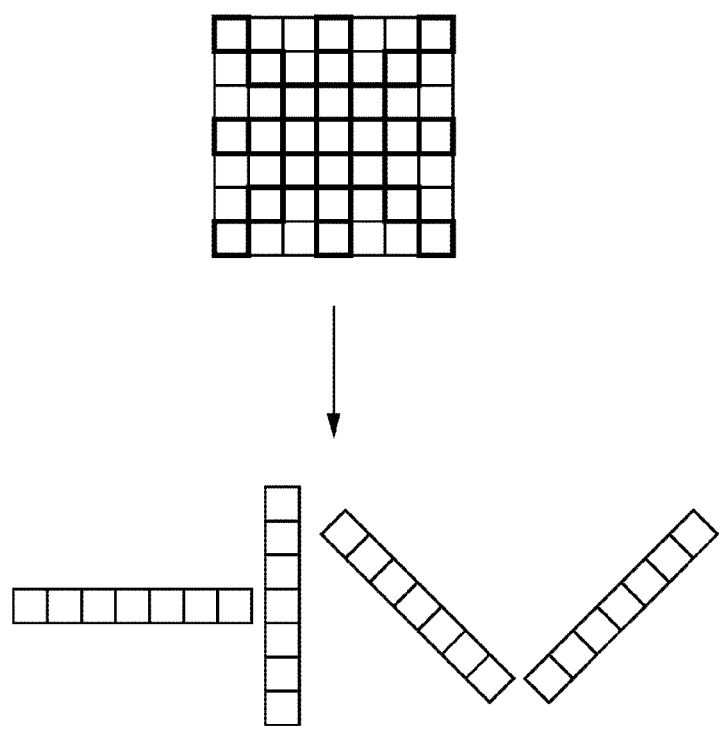
FIG. 10 illustrates exemplary extraction of four directions.

Step S802 is a step of extracting four directions. More specifically, the CPU 11 extracts a group of seven consecutive pixels aligned in the lateral direction, a group of seven consecutive pixels aligned in the vertical direction, a group of seven consecutive pixels aligned in a left ascending direction, and a group of seven consecutive pixels aligned in a right ascending direction, from the processing region of the luminance L generated in step S801, as illustrated in FIG. 10.

Figure 11:
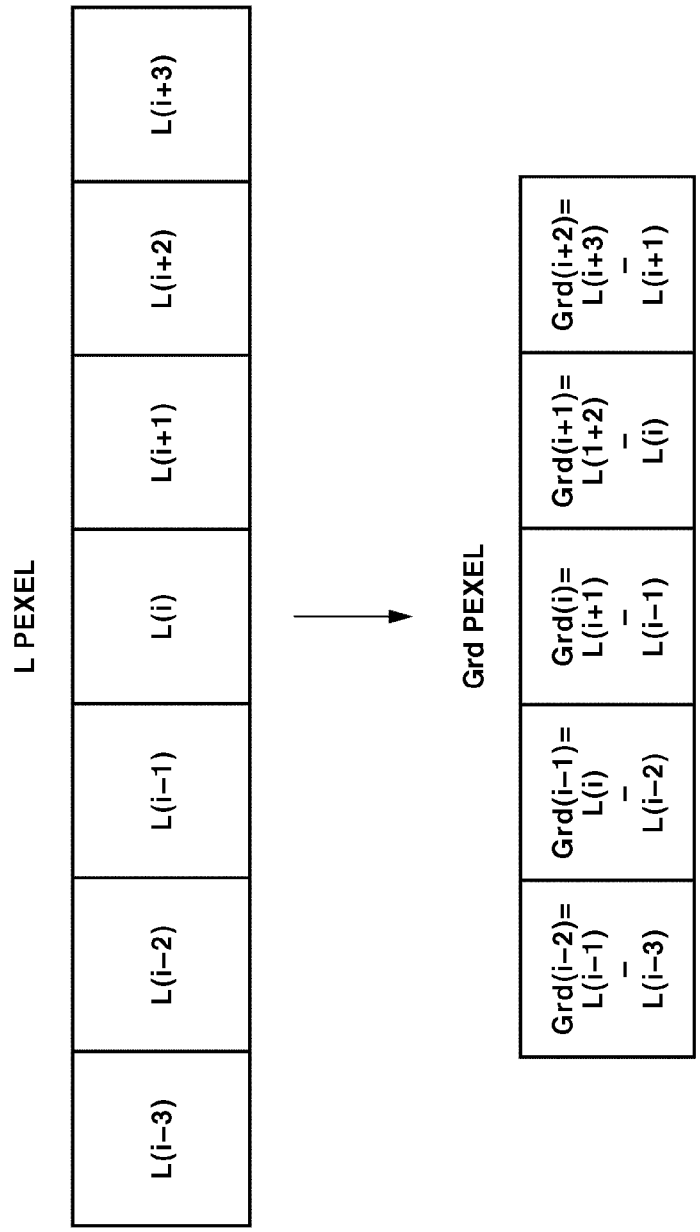
FIG. 11 illustrates exemplary L differences.

Step S803 is a step of calculating L difference. As illustrated in FIG. 11 and apparent from the following formula (2), the CPU 11 calculates difference Grd of the luminance L for five pairs of pixels in each direction, based on the luminance L of four directions extracted in step S802.

$$Grd(i)=L(i+1)-L(i-1) \quad (2)$$

In the formula (2), pixel L(i−1) precedes pixel L(i) and pixel L(i+1) succeeds the pixel L(i). The method for calculating the L difference is not limited to a specific method. For example, the CPU 11 can calculate the L difference between two neighboring pixels or any two pixels further spaced away.

FIG. 9B1 illustrates the difference Grd obtained by applying the formula (2) to the luminance L of FIG. 9A1. FIG. 9B2 illustrates the difference Grd obtained by applying the formula (2) to the luminance L of FIG. 9A2.

Step S804 is a step of determining an edge direction. More specifically, the CPU 11 obtains an absolute value of Grd in each of the four directions of the target pixel calculated in step S803. The CPU 11 determines a direction of a maximum absolute value of Grd as an edge direction of the target pixel.

Step S805 is a step of calculating a variation amount. More specifically, the CPU 11 calculates the differences Grd in step S803 about five pixels of the seven consecutive pixels aligned in the edge direction determined in step S804. The CPU 11 compares the calculated differences Grd of the five pixels, and identifies a maximum absolute value as a variation amount of the target pixel (edge amount).

As illustrated in FIGS. 9B1 and 9B2, a variation amount in the main-scanning direction is smaller than a variation amount in the sub-scanning direction because of higher smoothing effects derived from the main-scanning resolution which is lower than the sub-scanning.

Namely, sharpness of an image in the main-scanning direction is different from that in the sub-scanning direction. In other words, the degree of the defocused state in the main-scanning direction is different from that in the sub-scanning direction. Furthermore, the lens characteristics of a scanner are variable depending on the direction.

Therefore, if a scanner has the MTF differentiated between the main-scanning direction and the sub-scanning direction, the sharpness of an image is variable depending on the direction even if the main-scanning resolution is not different from the sub-scanning resolution. The technique according to the present exemplary embodiment can be applied to any image data whose sharpness is variable depending on the direction.

Step S806 is a step of calculating the number of times of variation. The CPU 11 sums up the number of times of variation occurring in the difference Grd of four directions calculated in step S803.

In the present exemplary embodiment, the CPU 11 counts the number of changes in the sign of the difference Grd which changes from + to − or vice versa, or may change from + to 0 and next to + or change from − to 0 and next to + (i.e., the number of zero-crossing points), as the number of times of variation of the target pixel.

Step S807 is a step of determining maximum and minimum luminance positions. More specifically, the CPU 11 determines the positions of pixels having the maximum luminance L and the minimum luminance L from the seven consecutive pixels of the luminance L aligned in the edge direction, selected from four directions extracted in step S802, about the edge direction determined in step S804.

Step S808 is a step of calculating the variation acceleration. The CPU 11 calculates variation acceleration Lap of three pixels based on the differences Grd of the edge direction calculated in step S803, about the edge direction determined in step S804.

More specifically, the CPU 11 can calculate the variation acceleration based on the following formula (3) in which pixel Grd(i−1) precedes pixel Grd(i) and pixel Grd(i+1) succeeds the pixel Grd(i).

FIG. 9C1 and FIG. 9C2 illustrate the variation acceleration Lap obtained by applying the formula (3) to the difference Grd of FIG. 9B1 and FIG. 9B2, respectively.

$$Lap(i)=Grd(i+1)-Grd(i-1) \quad (3)$$

The method for calculating the variation acceleration is not limited to the above-described method. For example, the CPU 11 can calculate the variation acceleration based on differences between neighboring pixels Grd.

Step S809 is a step of determining the position of a pixel to be replaced. The CPU 11 determines the position of a pixel to be replaced based on the positions of pixels having the maximum luminance L and the minimum luminance L determined in step S807 and the variation acceleration Lap calculated in step S808.

As illustrated in FIGS. 9C1 and 9C2, when the sign of Lap is plus, the L value of the target pixel tends to be closer to the minimum L rather than the maximum L. When the sign of Lap is minus, the L value of the target pixel tends to be closer to the maximum L rather than the minimum L.

Hence, the CPU 11 determines the position of a pixel to be replaced based on the sign of Lap with reference to the table 1. As a result of replacement, the CPU 11 can obtain L values illustrated in FIGS. 9D1 and 9D2 changed from the L values illustrated in FIGS. 9A1 and 9A2.

Although the present exemplary embodiment determines the position of a pixel to be replaced with reference to the table 1, an edge center where the Lap of the target pixel becomes 0 can be determined without using the table 1. For example, if the Lap of the target pixel is 0, the position of a pixel to be replaced can be the position of a pixel having the maximum L or the minimum L.

TABLE 1

| Sign of Lap of target pixel | + | − | 0 | 0 | 0 |
|---|---|---|---|---|---|
| Sum of Lap signs of back and forth pixels | | | + | − | 0 |
| Position of pixel to be replaced | Minimum L | Maximum L | Minimum L | Maximum L | Maximum L |

Step S810 is a step of setting replacement intensity Ce based on the variation amount. Completely replacing the target pixel values with the replacement pixel values determined in step S809 can enhance the sharpness of an image as apparent from the comparison between the replaced L values illustrated in FIGS. 9D1 and 9D2 and the original L values illustrated in FIGS. 9A1 and 9A2.

However, a jaggy image region may stand out. According to the present exemplary embodiment in which the main-scanning direction is a low resolution direction, a jaggy image region tends to become larger and/or intensified when the resolution becomes higher. Hence, the present exemplary embodiment describes exemplary replacement processing capable of intensifying the edge while limiting an intensity of a jaggy image region.

As illustrated in FIGS. 9B1 and 9B2, the variation amount in the sub-scanning direction (i.e., high resolution direction) is larger than the variation amount in the main-scanning direction (i.e., low resolution direction).

Considering this relationship, the present exemplary embodiment sets the thresholds such that the replacement intensity Ce in the sub-scanning direction becomes larger than that in the main-scanning direction, as described below.

Figure 13A:
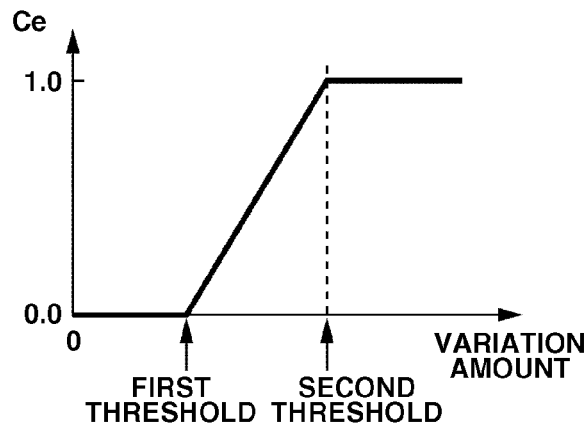
FIGS. 13A to 13C illustrate exemplary thresholds for replacement processing according to the first exemplary embodiment.

FIG. 13A is a graph illustrating exemplary setting of the replacement intensity Ce in step S810. In FIG. 13A, an abscissa represents the variation amount, an ordinate represents the replacement intensity Ce, and first and second thresholds are predetermined thresholds obtained from the measurement data of FIGS. 9A1-9D2.

More specifically, the first and second thresholds can be determined beforehand based on the luminance L measured by the CIS that performs main-scanning of black vertical lines (4 lines/mm) in contrast with white background and the luminance L measured by the CIS that performs sub-scanning of black lateral lines (4 lines/mm) in contrast with white background.

The first threshold is set to be a value not greater than the absolute value of the maximum variation amount (i.e., absolute value of maximum Grd) in the sub-scanning direction of FIG. 9B2. The second threshold is set to be a value not less than the absolute value of the maximum variation amount (i.e., absolute value of maximum Grd) in the main-scanning direction of FIG. 9B1.

The first threshold and the second threshold are set in a range satisfying the relationship "maximum variation amount in the main-scanning direction≦first threshold<second threshold≦maximum variation amount in the sub-scanning direction."

When the variation amount is less than the first threshold, the CPU 11 sets the replacement intensity Ce to 0. When the variation amount is greater than the second threshold, the CPU 11 sets the replacement intensity Ce to 1 for complete replacement.

When the variation amount is in a range from the first threshold to the second threshold, the CPU 11 adaptively sets the replacement intensity Ce which linearly changes depending on the variation amount from 0 (when the variation amount is equal to the first threshold) to 1 (when the variation amount is equal to the second threshold).

More specifically, the CPU 11 can adaptively set replacement intensity Ce with reference to the relationship illustrated in FIG. 13A or based on the following formula (4).

$$Ce=(\text{variation amount}-\text{first threshold})/(\text{second threshold}-\text{first threshold}) \quad (4)$$

With the above-described settings, the CPU 11 can set the replacement intensity of the sub-scanning direction which is greater than the replacement intensity of the main-scanning direction. In other word, the present exemplary embodiment can limit the occurrence of a jaggy image by reducing the replacement intensity of the main-scanning direction (i.e., the direction having a higher possibility of generating a jaggy image).

In general, a moire image (e.g., an image having a moire appearance or moire effect portion) tends to occur in the main-scanning direction (i.e., in the low resolution direction). The present exemplary embodiment can limit generation of a moire image by setting the first threshold which is not greater than the variation amount in the sub-scanning direction and the second threshold which is not less than the variation amount in the main-scanning direction. The threshold setting according to the present exemplary embodiment is effective in limiting the moire intensification.

Compared to the technique discussed in Japanese Patent No. 03099354, the present exemplary embodiment has the following features. The technique discussed in Japanese Patent No 03099354 has the purpose and effects of eliminating discontinuity (switching) in the edge intensifying processing without intensifying the noise.

According to the technique discussed in Japanese Patent No. 03099354, the replacement intensity in the sub-scanning direction may become smaller than the replacement intensity in the main-scanning direction.

In the present exemplary embodiment, setting the first threshold to be a value not greater than the variation amount in the sub-scanning direction and setting the second threshold to be a value not less than variation amount in the main-scanning direction becomes feasible based on the relationship that the variation amount in the sub-scanning direction (i.e., high resolution direction) is smaller than the variation amount in the main-scanning direction (low resolution direction).

Figure 12A:
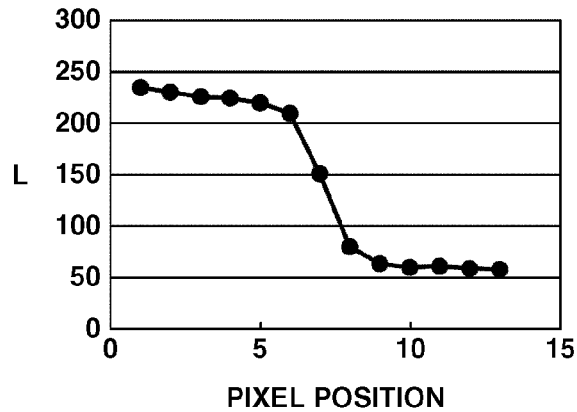
FIGS. 12A to 12C illustrate exemplary replacement of image data.
Figure 12B:
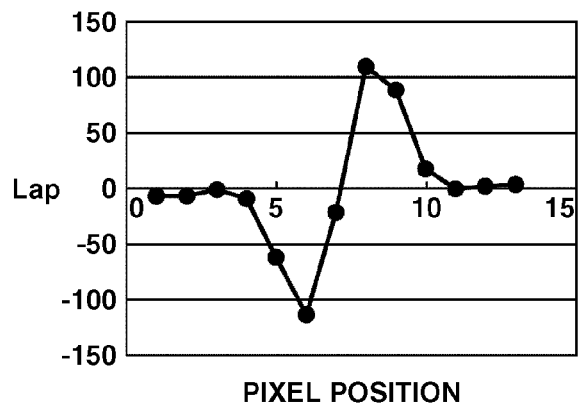
Figure 12C:
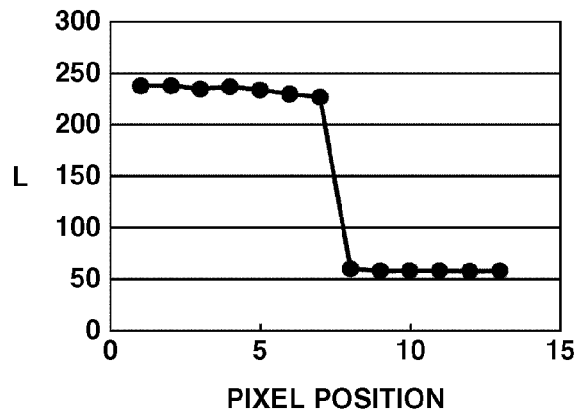

The replacement processing can reduce color shifts in the following manner. FIG. 12A illustrates L values in a state where the replacement processing is not yet performed. FIG. 12B illustrates Lap values of the L values illustrated in FIG. 12A. FIG. 12C illustrates L values resulting from the replacement processing. The color shifts tend to appear on or near an edge, e.g., the position corresponding to the seventh pixel illustrated in FIG. 12A.

The present exemplary embodiment performs the replacement processing in such a way as to replace the sixth pixel of FIG. 12A with the third pixel, the seventh pixel of FIG. 12A with the fourth pixel, and the eighth pixel of FIG. 12A with the eleventh pixel (refer to FIG. 12C).

In other words, the present exemplary embodiment can replace any pixel having a higher possibility of causing the color shift with the pixel of a background or a black character (which does not generate the color shift). Thus, the present exemplary embodiment can reduce color shifts. The replacement processing is effective in enhancing the sharpness and reducing the color shifts, and is therefore applicable to the CIS according to the present exemplary embodiment.

Setting of the above-described thresholds can be determined beforehand based on experimentally obtained data. Alternatively, the thresholds can be set appropriately based on data obtained from a pre-scanned or scanned image.

Step S811 is a step of setting replacement intensity Cl based on the absolute value of the variation acceleration. The CPU 11 sets the replacement intensity Cl adaptively depending on the absolute value of the variation acceleration calculated in step S808.

As illustrated in FIGS. 9C1 and 9C2, the absolute value of variation acceleration in the sub-scanning direction (i.e., high resolution direction) is greater than that in the main-scanning direction (i.e., low resolution direction). Hence, the present exemplary embodiment sets the thresholds in such a way as to have the replacement intensity Cl in the sub-scanning direction which is greater than that in the main-scanning direction, as described below.

Figure 13B:
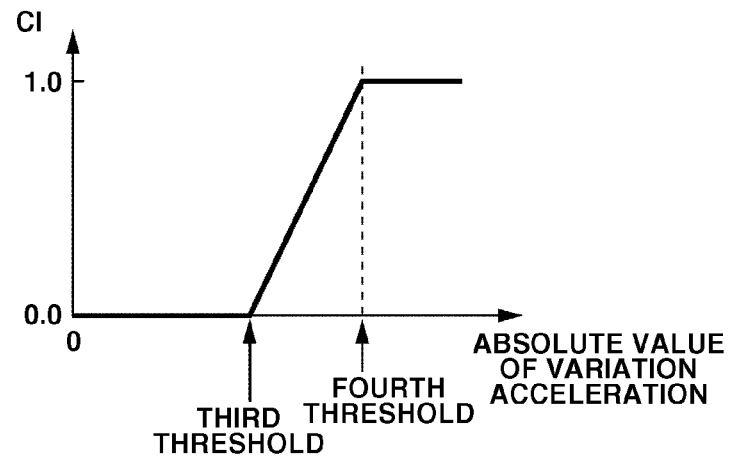

FIG. 13B is a graph illustrating exemplary setting of the replacement intensity Cl in step S811. In FIG. 13B, an abscissa represents the absolute value of the variation acceleration, an ordinate represents the replacement intensity Cl, and third and fourth thresholds are predetermined thresholds obtained from the measurement data of FIGS. 9A1-9D2.

More specifically, the third and fourth thresholds can be determined beforehand based on the luminance L measured by the CIS that performs main-scanning of black vertical lines (4 lines/mm) in contrast with white background and the luminance L measured by the CIS that performs sub-scanning of black lateral lines (4 lines/mm) in contrast with white background.

The third threshold is set to be a value not greater than the absolute value of the maximum variation acceleration (i.e., absolute value of maximum Lap) in the sub-scanning direction of FIG. 9C2. The fourth threshold is set to be a value not less than the absolute value of the maximum variation acceleration (i.e., absolute value of maximum Lap) in the main-scanning direction of FIG. 9C1.

The third threshold and the fourth threshold are set in a range satisfying the relationship "maximum absolute value of the variation acceleration in the main-scanning direction≦third threshold<fourth threshold≦maximum absolute value of the variation acceleration in the sub-scanning direction."

When the absolute value of the variation acceleration is less than the third threshold, the CPU 11 sets the replacement intensity Cl to 0. When the absolute value of the variation acceleration is greater than the fourth threshold, the CPU 11 sets the replacement intensity Cl to 1 for complete replacement.

When the absolute value of the variation acceleration is in a range from the third threshold to the fourth threshold, the CPU 11 adaptively sets the replacement intensity Cl which linearly changes depending on the absolute value of the variation acceleration from 0 (when the absolute value of the variation acceleration is equal to the third threshold) to 1 (when the absolute value of the variation acceleration is equal to the fourth threshold).

More specifically, the CPU 11 can set the replacement intensity Cl adaptively with reference to the graph illustrated in FIG. 13B or based on the following formula (5).

$$Cl = (\text{absolute value of the variation acceleration} - \text{third threshold})/(\text{fourth threshold} - \text{third threshold}) \quad (5)$$

Through the above-described settings, the CPU 11 can set the replacement intensity in the sub-scanning direction which is not smaller than the replacement intensity in the main-scanning direction.

The present exemplary embodiment can limit the replacement intensity in the main-scanning direction (i.e., the direction having a higher possibility of generating a jaggy image) and therefore can reduce the occurrence of a jaggy image. Furthermore, the present exemplary embodiment can reduce the occurrence of a moire image in the main-scanning direction which may arise due to replacement processing and can enhance the sharpness in the sub-scanning direction.

Step S812 is a step of setting replacement intensity Cz based on the number of times of variation. More specifically, the CPU 11 sets the replacement intensity Cz adaptively depending on the number of times of variation calculated in step S806.

Figure 13C:
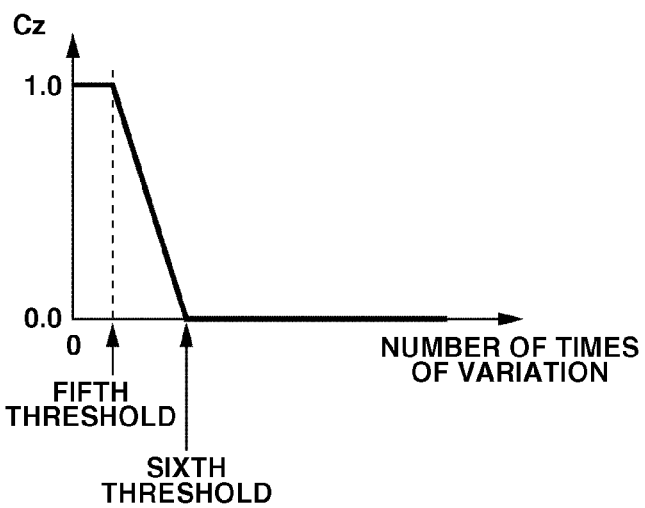

The CPU 11 sets the replacement intensity Cz with reference to the characteristics defined by fifth and sixth thresholds as illustrated in FIG. 13C. If the number of times of variation is less than the fifth threshold (e.g., bold line), the CPU 11 sets Cz to 1 (Cz=1). If the number of times of variation is greater than the sixth threshold (e.g., a thin line or a halftone dot), the CPU 11 sets Cz to 0 (Cz=0).

If the number of times of variation is in a range from the fifth threshold to the sixth threshold, the CPU 11 can set Cz adaptively based on the following formula (6).

$$Cz=(\text{sixth threshold}-\text{number of times of variation})/(\text{sixth threshold}-\text{fifth threshold}) \quad (6)$$

Through the above-described settings, the present exemplary embodiment can limit intensification applied to a thin line having a higher possibility of generating a jaggy image and a halftone dot image having a higher possibility of generating a moire image, and further can intensify a bold line.

Step S813 is a step of calculating an amount of replacement. The CPU 11 calculates an amount of replacement based on a pixel value of the position of a pixel to be replaced determined in step S809. The CPU 11 extracts RGB values of the position of a pixel to be replaced which is determined in step S809, from the 7×7 region of RGB set in step S801. The CPU 11 can calculate ΔC based on the following formula (7) when N0 represents a target pixel value, C0 represents a pixel value of the position of a pixel to be replaced, and ΔC represents an amount of replacement.

$$\Delta C = C0 - N0 \quad (7)$$

Step S814 is a step of correcting the replacement amount. The CPU 11 corrects the replacement amount ΔC calculated in step S813 with the replacement intensities Ce, Cl, and Cz set in steps S810 to S812. The CPU 11 calculates a corrected replacement amount ΔC' based on the following formula (8).

$$\Delta C' = Ce \times Cl \times Cz \times \Delta C \quad (8)$$

Step S815 is a step of completing the replacement processing. The CPU 11 calculates, as an edge intensified output resulting from the replacement processing, a target pixel value Nc by adding the replacement amount ΔC' calculated in step S814 to the target pixel value N0 as illustrated in the following formula (9).

$$Nc = N0 + \Delta C' \quad (9)$$

Through the above-described replacement processing, the present exemplary embodiment can perform replacement processing using the intensity in the main-scanning direction which is weak compared to that in the sub-scanning direction. Thus, the present exemplary embodiment can limit the replacement intensity in the main-scanning direction (i.e., in the direction having a higher possibility of generating a jaggy image), and accordingly can reduce the occurrence of a jaggy image. Furthermore, the present exemplary embodiment can limit the moire intensification which may occur in the main-scanning direction (i.e., low resolution direction) and can enhance the sharpness in the sub-scanning direction.

The present exemplary embodiment uses the feature quantity relating to the luminance L. However, the feature quantity is not limited to the luminance L and can be a value relating to RGB pixel values. Furthermore, the present exemplary embodiment is not limited to the resolution varying depending on the direction. For example, the correction intensity such as replacement intensity can be changed based on any feature quantity derived from MTF, defocused state, and sharpness varying depending on the direction.

Second Exemplary Embodiment

The first exemplary embodiment changes the replacement intensity based on the feature quantity derived from the resolution varying depending on the direction. However, the processing performed according to the present invention is not limited to the replacement processing. The second exemplary embodiment is described below with reference to filter processing as other exemplary processing.

Figures 14A, 14B:
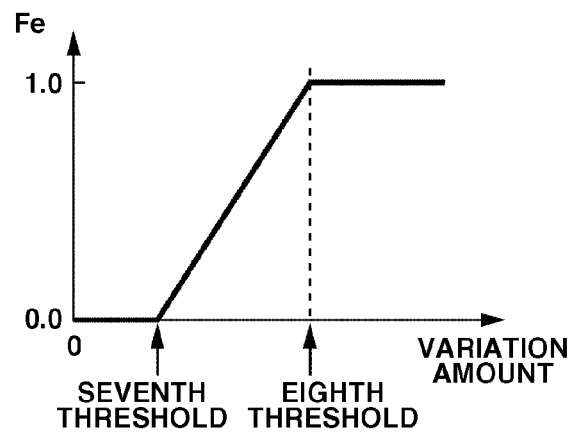
FIGS. 14A and 14B illustrate exemplary filtering processing according to a second exemplary embodiment.

FIG. 14A illustrates a 5×5 filter including a central target pixel according to the second exemplary embodiment. The CPU 11 can calculate a filtering edge intensifying amount ΔF based on the formula (10) when N0 represents a target pixel value and F0 represents a target pixel value having been filtered.

$$\Delta F = F0 - N0 \quad (10)$$

FIG. 14B is a graph illustrating exemplary setting of filter intensity Fe. The seventh threshold is set to be a value not greater than the variation amount in the sub-scanning direction. The eighth threshold is set to be a value not less than the variation amount in the main-scanning direction. The seventh threshold and the eighth threshold can be different from the first threshold and the second threshold, or can be set appropriately depending on the type of correction processing.

When the variation amount is less than the seventh threshold, the CPU 11 sets the filter intensity Fe to 0. When the variation amount is greater than the eighth threshold, the CPU 11 sets the filter intensity Fe to 1 for complete replacement. When the variation amount is in a range from the seventh threshold to the eighth threshold, the CPU 11 adaptively sets the filter intensity Fe which linearly changes depending on the variation amount from 0 (when the variation amount is equal to the seventh threshold) to 1 (when the variation amount is equal to the eighth threshold).

More specifically, the CPU 11 can adaptively set the filter intensity Fe with reference to the graph illustrated in FIG. 14B or based on the following formula (11).

$$Fe=(\text{variation amount}-\text{seventh threshold})/(\text{eighth threshold}-\text{seventh threshold}) \quad (11)$$

The CPU 11 can calculate a corrected filter intensifying amount ΔF' based on the following formula (12).

$$\Delta F' = Fe \times \Delta F \quad (12)$$

The CPU 11 can use the following formula (13) to calculate a target pixel value Nf having been edge intensified by a filter.

$$Nf = N0 + \Delta F' \quad (13)$$

Through the above-described settings, the present exemplary embodiment can set the filter intensity in the sub-scanning direction which is not less than the filter intensity in the main-scanning direction. There is the tendency that a jaggy image occurs when the filter intensity is large. The present exemplary embodiment can limit the filter intensity in the main-scanning direction (i.e., in the direction having a higher possibility of generating a jaggy image) and accordingly can reduce the occurrence of a jaggy image.

Furthermore, there is the tendency that generation of a moire image increases in the main-scanning direction (i.e., in the low resolution direction). The seventh threshold is set to be a value not greater than the variation amount in the sub-scanning direction. The eighth threshold is set to be a value not less than the variation amount in the main-scanning direction. The above-described threshold settings can effectively limit the moire intensification generated by a filter.

The filter size and coefficients are not limited to the above-described examples. Therefore, the present exemplary embodiment can use another size and coefficients. Furthermore, the change of the filter intensity is not limited to the above-described example. Therefore, filter coefficients can be changed depending on the variation amount.

Third Exemplary Embodiment

The first and second exemplary embodiments change the replacement intensity and the filter intensity based on the feature quantity derived from the resolution varying depending on the direction. In a case of modulations applied to characters, achromatic coloring processing can be performed in addition to the above-described processing. The third exemplary embodiment is described below based on achromatic coloring processing.

Figures 15A, 15B:
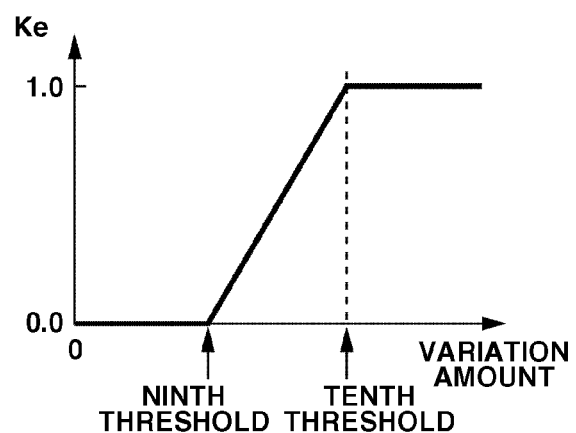
FIGS. 15A and 15B illustrate exemplary achromatic coloring processing according to a third exemplary embodiment.

The CPU 11 calculates an average value of each color in a 3×3 region including a central target pixel illustrated in FIG. 15A. When AR, AG, and AB represent average values of RGB pixel values having been read, the CPU 11 obtains color saturation corresponding to a maximum value among |AR−AG|, |AG−AB|, and |AB−AR|.

The calculation of the color saturation is not limited to the above-described example. The size of a target region is not limited to the above-described 3×3 region and can be selected from other regions having different sizes. Furthermore, the color space is not limited to the RGB space. The distance from the luminance axis can be obtained by using chrominance components obtained by converting a block into a luminance chrominance space.

The CPU 11 determines whether the target pixel is an achromatic color based on the comparison between the color saturation and a threshold being appropriately set. If the CPU 11 determines that the color saturation is not greater than the threshold and the target pixel is an achromatic color, the CPU 11 calculates an achromatic coloring amount ΔK based on the following formula (14), wherein N0 represents a target pixel value and Ng represents a green (G) value of the target pixel.

$$\Delta K = Ng - N0 \quad (14)$$

FIG. 15B is a graph illustrating exemplary setting of achromatic coloring intensity Ke. The ninth threshold is set to be a value not greater than the variation amount in the sub-scanning direction. The tenth threshold is set to be a value not less than the variation amount in the main-scanning direction.

The ninth threshold and tenth threshold can be different from the first threshold and the second threshold, or can be set appropriately depending on the type of correction processing. When the variation amount is less than the ninth threshold, the CPU 11 sets the achromatic coloring intensity Ke to 0. When the variation amount is larger than the tenth threshold, the CPU 11 sets the achromatic coloring intensity Ke to 1 for complete replacement.

When the variation amount is in a range from the ninth threshold to the tenth threshold, the CPU 11 adaptively sets the achromatic coloring intensity Ke which linearly changes depending on the variation amount from 0 (when the variation amount is equal to the ninth threshold) to 1 (when the variation amount is equal to the tenth threshold).

More specifically, the CPU 11 can adaptively set the achromatic coloring intensity Ke with reference to the graph illustrated in FIG. 15B or based on the following formula (15).

$$Ke = (\text{variation amount} - \text{ninth threshold}) / (\text{tenth threshold} - \text{ninth threshold}) \quad (15)$$

The CPU 11 can calculate corrected achromatic coloring amount ΔK' based on the following formula (16).

$$\Delta K' = Ke \times \Delta K \quad (16)$$

The CPU 11 can calculate target pixel value Nk of an achromatic color based on the following formula (17).

$$Nk = N0 + \Delta K' \quad (17)$$

Through the above-described settings, the present exemplary embodiment can set the achromatic coloring intensity in the sub-scanning direction which is not less than the achromatic coloring intensity in the main-scanning direction.

When the achromatic coloring processing has strong intensity, or when all of R, G, and B values are 0 or the same value, a printer may use only pigment inks. The pigment inks cause less bleeding on a recording medium, compared to dye inks. An edge of a printed image tends to be sharp. Therefore, there is a higher possibility of generating a jaggy image.

The present exemplary embodiment can limit the achromatic coloring intensity in the main-scanning direction (i.e., the direction having a higher possibility of generating a jaggy image) and therefore can reduce the occurrence of jaggy image regions.

In general, a moire image tends to be generated in the main-scanning direction (i.e., in the low resolution direction). The ninth threshold is set to be a value not greater than the variation amount in the sub-scanning direction. The tenth threshold is set to be a value not less than the variation amount in the main-scanning direction.

The above-described threshold settings can effectively limit moire intensification owing to increased density which may result from increase in a supply amount of black pigment for achromatic coloring processing.

Other Exemplary Embodiment

The above-described first, second, and third exemplary embodiments optimize the correction intensity by setting the thresholds depending on the difference of feature quantities when the scan unit 14 has the main-scanning resolution which is different from the sub-scanning resolution. An exemplary embodiment according to the present invention can be effective not only for the reading resolution but for other feature.

According to Joint Photographic Experts Group (JPEG) which is widely used as a compression file format, there are a plurality of combinations for the constituent elements of pixel data and sampling of pixels.

YCbCr4:2:2 (Y represents a luminance signal, and Cb and Cr represent chrominance signals) is a format for performing down sampling (sub sampling) in such a way that the sampling number of Y is two times the sampling number of Cb and Cr in the lateral direction. The down sampling includes averaging chrominance signals of two neighboring pixels in the lateral direction. The purpose of down sampling is reducing the file size, considering visual characteristics of human eyes which are insensitive against the change of Cb and Cr compared to the change of Y.

When JPEG is decompressed, the pixel number of Cb and Cr becomes equal to the pixel number of Y. However, a defocused state tends to occur in the lateral direction compared to the vertical direction, because Cb and Cr are averaged for the down-sampling in the lateral direction.

This is similar to the phenomenon in the first to third exemplary embodiments, in which the variation amount in the sub-scanning direction (i.e., high resolution direction) is larger compared to the variation amount in the main-scanning direction. According to JPEG of YCbCr4:2:2, chrominance components have a variation amount in the vertical direction which is greater than that in the lateral direction.

Accordingly, it is difficult to optimum the processing result if image processing is performed by setting the same intensity in both the lateral and vertical directions without considering the difference in feature quantities. Hence, the processing result can be optimized by setting thresholds considering the difference in feature quantities, so as to obtain the correction intensity varying depending on the direction.

Furthermore, YCbCr4:2:0 is a format for performing down-sampling in such a way that the sampling number of Y is two times the sampling number of Cb and Cr in both the lateral direction and the vertical direction. According to this format, the processing result can be optimized by differentiating the correction intensity for Y from the correction intensity for Cb and Cr based on appropriate settings of thresholds.

As described above, the present exemplary embodiment is effective not only for the characteristic feature derived from the difference in reading resolution but also for the characteristic feature derived from the difference in sampling number.

The exemplary embodiments of the present invention apply correction processing to image data having the resolution varying depending on the alignment direction of pixels, with reference to the difference of the feature quantity in the alignment direction of pixels.

The exemplary embodiments of the present invention sets thresholds optimized according to the difference in the feature quantity and the type of image processing (correction processing). Thus, the exemplary embodiments of the present invention can set optimum intensity for the correction processing depending on the alignment direction of pixels.

As a result, the exemplary embodiments of the present invention can eliminate image deteriorations which tend to occur in the conventional image processing due to the resolution varying in each alignment direction of pixels.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-188047 filed Jul. 7, 2006, which is hereby incorporated by reference herein in its entirety.

What is claimed is:

1. An image processing apparatus for performing an edge intensifying processing of an image, the image processing apparatus comprising:
   an obtaining unit configured to obtain image data generated by optically reading a document, the image data corresponding to respective pixels aligned in a main scanning direction and a sub-scanning direction perpendicular to the main scanning direction;
   a determination unit configured to determine an edge direction of an image;
   a setting unit configured to set an intensity of the edge intensifying processing based on the image data and an intensity of processing determined corresponding to a difference between resolution in the main scanning direction and resolution in the sub-scanning direction; and
   a processing unit configured to perform the edge intensifying processing of an image according to the intensity set by the setting unit,
   wherein, in response to the resolution of the image data being higher in the sub-scanning direction than in the main scanning direction, the setting unit sets a higher intensity of the edge intensifying processing in response to the edge direction being along the sub-scanning direction than in response to the edge direction being along the main scanning direction,
   wherein the setting unit sets the intensity of processing according to a result of comparing a variation amount of the image data in the edge direction with a threshold, and
   wherein the setting unit sets the threshold such that the intensity of the edge intensifying processing varies according to the variation amount in an alignment direction of pixels.

2. The image processing apparatus according to claim 1, further comprising:
   a sensor configured to read a document image, the sensor having imaging elements aligned in the main scanning direction at an interval corresponding to predetermined resolution,
   wherein the image data is obtained by reading the document at first resolution equal to or lower than the predetermined resolution in the main scanning direction and reading the document at second resolution higher than the first resolution in the sub-scanning direction, while moving the sensor in the sub-scanning direction.

3. The image processing apparatus according to claim 1, wherein the threshold includes a first threshold equal to or lower than a variation amount of pixels in the sub-scanning direction and a second threshold equal to or higher than a variation amount of pixels in the main scanning direction.

4. The image processing apparatus according to claim 1, wherein the edge intensifying processing is at least one of replacement processing, filter processing, and achromatic coloring processing.

5. The image processing apparatus according to claim 4, wherein correction intensity is replacement intensity.

6. The image processing apparatus according to claim 4, wherein correction intensity is filter intensity.

7. The image processing apparatus according to claim 4, wherein correction intensity is achromatic coloring intensity.

8. An image processing method for performing an edge intensifying processing of an image, the image processing method comprising:
   obtaining image data generated by optically reading a document, the image data corresponding to respective pixels aligned in a main scanning direction and a sub-scanning direction perpendicular to the main scanning direction;
   determining an edge direction of an image;
   setting an intensity of the edge intensifying processing based on the image data and an intensity of processing determined corresponding to a difference between resolution in the main scanning direction and resolution in the sub-scanning direction; and
   performing the edge intensifying processing of an image according to the set intensity,
   wherein, in response to the resolution of the image data being higher in the sub-scanning direction than in the main scanning direction, setting includes setting a higher intensity of the edge intensifying processing in response to the edge direction being along the sub-scanning direction than in response to the edge direction being along the main scanning direction,
   wherein setting includes setting the intensity of processing according to a result of comparing a variation amount of the image data in the edge direction with a threshold, and
   wherein setting includes setting the threshold such that the intensity of the edge intensifying processing varies according to the variation amount in an alignment direction of pixels.

* * * * *